(12) United States Patent
McDonough, Jr. et al.

(10) Patent No.: US 9,560,441 B1
(45) Date of Patent: Jan. 31, 2017

(54) DETERMINING SPEAKER DIRECTION USING A SPHERICAL MICROPHONE ARRAY

(71) Applicant: Amazon Technologies, Inc., Seattle, WA (US)

(72) Inventors: John Walter McDonough, Jr., Cambridge, MA (US); Volker Sebastian Leutnant, Duesseldorf (DE); Sri Venkata Surya Siva Rama Krishna Garimell, Visakhapatnam (IN); Spyridon Matsoukas, Hopkinton, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 62 days.

(21) Appl. No.: 14/582,305

(22) Filed: Dec. 24, 2014

(51) Int. Cl.
| | |
|---|---|
| *H04R 3/00* | (2006.01) |
| *H04R 1/32* | (2006.01) |
| *H04R 25/00* | (2006.01) |
| *H04R 1/40* | (2006.01) |
| *H04R 5/027* | (2006.01) |
| *H04R 1/20* | (2006.01) |

(52) U.S. Cl.
CPC .............. *H04R 1/326* (2013.01); *H04R 1/406* (2013.01); *H04R 3/005* (2013.01); *H04R 25/407* (2013.01); *H04R 1/20* (2013.01); *H04R 1/32* (2013.01); *H04R 5/027* (2013.01); *H04R 2201/401* (2013.01)

(58) Field of Classification Search
CPC ......... H04R 1/326; H04R 3/005; H04R 5/027; H04R 1/20; H04R 1/32; H04R 1/406; H04R 2201/401; H04R 25/407
See application file for complete search history.

(56) References Cited

U.S. PATENT DOCUMENTS

| | | | | |
|---|---|---|---|---|
| 8,098,842 | B2 * | 1/2012 | Florencio | H04R 3/005 367/119 |
| 2007/0263881 | A1 * | 11/2007 | Maziar | G01S 3/801 381/92 |
| 2008/0247565 | A1 * | 10/2008 | Elko | H04R 3/005 381/92 |
| 2012/0195436 | A1 * | 8/2012 | Nakadai | H04R 3/005 381/56 |
| 2014/0286493 | A1 * | 9/2014 | Kordon | H04R 3/005 381/26 |

OTHER PUBLICATIONS

Arfken, et al. Mathematical Methods for Physicists. Boston: Elsevier, 2005.

(Continued)

*Primary Examiner* — Andrew L Sniezek
(74) *Attorney, Agent, or Firm* — Seyfarth Shaw LLP; Ilan N. Barzilay; Tyrus S. Cartwright (57) ABSTRACT

A system that detects audio including speech using a spherical sensor array estimates a direction of arrival of the speech using a Kalman filter. To improve the estimates of the Kalman filter, the system estimates a noise covariance matrix, representing noise detected by the array. The structure of the noise covariance matrix is determined, using an assumption of spherically isotropic diffuse noise. The intensity of the noise covariance matrix is estimated based on the intensity of audio detected by the array.

18 Claims, 7 Drawing Sheets

(56) References Cited

OTHER PUBLICATIONS

Benesty. Adaptive Eigenvalue Decomposition Algorithm for Passive Acoustic Source Localization. The Journal of the Acoustical Society of America, vol. 107, No. 1, pp. 384-391, Jan. 2000.
Carter. Time Delay Estimation for Passive Sonar Signal Processing. Acoustics, Speech and Signal Processing, IEEE Transactions. vol. 29, No. 3, pp. 463-470, 1981.
Driscoll, et al. Computing Fourier Transforms and Convolutions on the 2-Sphere. Advances in Applied Mathematics. vol. 15, No. 2, pp. 202-250, 1994.
Dunster. Legendre and Related Functions. NIST Handbook of Mathematical Functions. pp. 351-381, 2010.
Elko. Spatial Coherence Functions for Differential Microphones in Isotropic Noise Fields. Microphone Arrays. pp. 61-85. Springer Berlin Heidelberg, 2001.
Fisher et al. Near-Field Spherical Microphone Array Processing With Radial Filtering. Audio, Speech, and Language Processing, IEEE Transactions. vol. 19, No. 2, pp. 256-265, 2011.
Klee, et al. Kalman Filters for Time Delay of Arrival—Based Source Localization. Proceedings of Eurospeech, 2005.
Kumatani, et al. Microphone Array Processing for Distant Speech Recognition: From Close-Talking Microphones to Far-Field Sensors. Signal Processing Magazine, IEEE. vol. 29, No. 6, pp. 127-140, 2012.
McDonough, et al. Speaker Tracking With Spherical Microphone Arrays. Acoustics, Speech and Signal Processing (ICASSP), IEEE International Conference, pp. 3981-3985, 2013.
McDonough, et al. Microphone Arrays for Distant Speech Recognition: Spherical Arrays. Proc. APSIPA Conference, Hollywood, CA, Dec. 2012.
Meyer, et al. A Highly Scalable Spherical Microphone Array Based on an Orthonormal Decomposition of the Soundfield. Acoustics, Speech, and Signal Processing (ICASSP), 2002 IEEE International Conference. vol. 2, pp. 11-1781, 11-1784. IEEE, 2002.
Olver, et al. NIST Handbook of Mathematical Functions. Cambridge University Press, 2010.
Rafaely, et al. Spherical Microphone Array Beamforming. Speech Processing in Modern Communication, pp. 281-305. Springer Berlin Heidelberg, 2010.
Sun, et al. Robust Localization of Multiple Sources in Reverberant Environments Using EB-ESPRIT With Spherical Microphone Arrays. Acoustics, Speech and Signal Processing (ICASSP), 2011 IEEE International Conference, pp. 117-120. IEEE, 2011.
Teutsch, et al. Acoustic Source Detection and Localization Based on Wavefield Decomposition Using Circular Microphone Arrays. The Journal of the Acoustical Society of America. vol. 120, No. 5, pp. 2724-2736, 2006.
Teutsch, et al. Detection and Localization of Multiple Wideband Acoustic Sources Based on Wavefield Decomposition Using Spherical Apertures. Acoustics, Speech and Signal Processing, 2008. IEEE International Conference. pp. 5276-5279. IEEE, 2008.
Williams. Fourier Aoustics: Sound Radiation and Nearfield Acoustical Holography. Academic Press, 1999.

* cited by examiner

DETERMINING SPEAKER DIRECTION USING A SPHERICAL MICROPHONE ARRAY

BACKGROUND

Computing devices routinely employ techniques to identify the words spoken by a human user based on the various qualities of a received audio input. Such techniques are called speech recognition or automatic speech recognition (ASR). Speech recognition combined with natural language processing (NLP) techniques may allow a user to control a computing device to perform tasks based on the user's spoken commands. ASR and NLP may together be considered types of speech processing.

BRIEF DESCRIPTION OF DRAWINGS

For a more complete understanding of the present disclosure, reference is now made to the following description taken in conjunction with the accompanying drawings.

DETAILED DESCRIPTION

Speech processing and other sound detection and processing have become important parts of a number of different computing systems. For certain speech processing systems it may be desirable to know (or at least to estimate or infer) where the speaker is relative to the sensor(s)/microphone(s) that are detecting the speech. Knowing the relative direction that the speech will be arriving from may enable various direction-specific features or capabilities that may improve the output of the system. To infer the position of the speaker, multiple sensors/microphones may be used. Knowing the position between the individual sensors/microphones and the speed at which sound travels, the time differences between the arrival of speech at the different sensors/microphones may be used to infer the position or movement of the speaker relative to the sensors/microphones.

Figure 1:
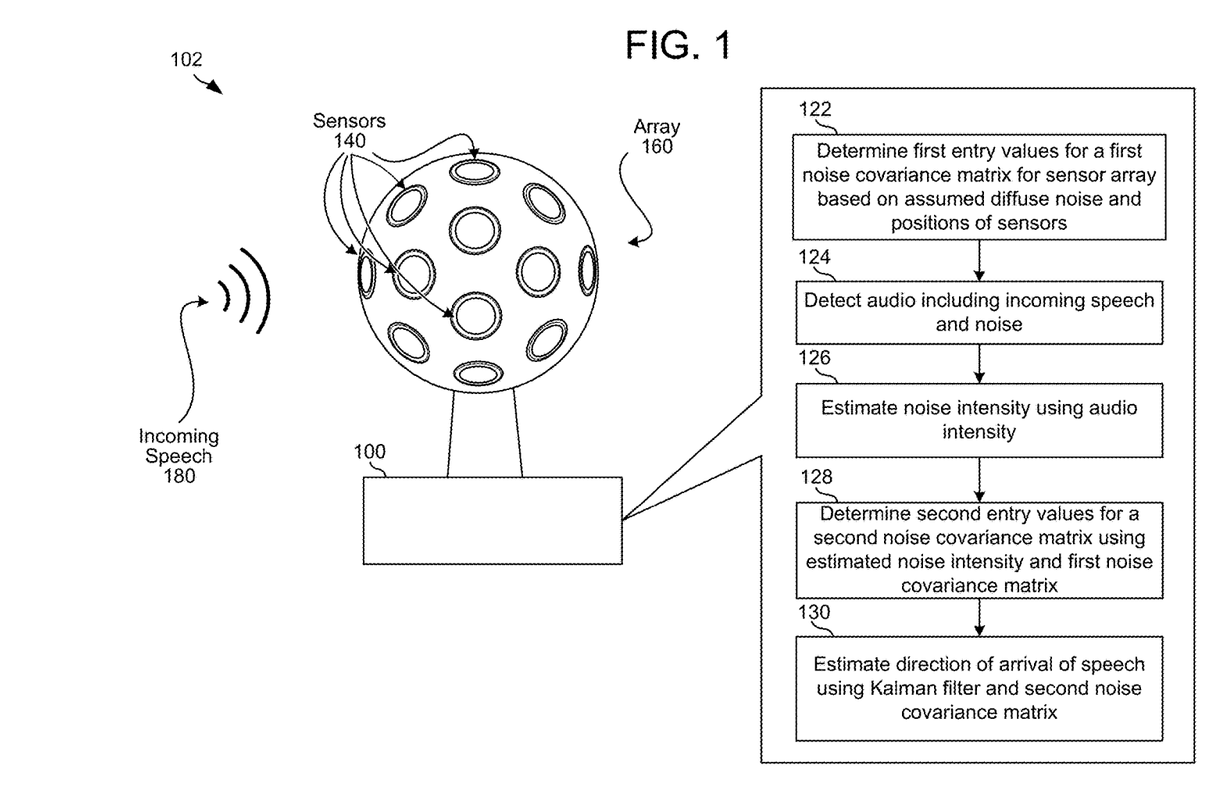
FIG. 1 illustrates a system for estimating a direction of arrival of speech using a spherical sensor/microphone array according to one embodiment of the present disclosure.

One particular sensor arrangement that may be used with such systems is a spherical sensor array. FIG. 1 shows a system 102, including a device 100 that includes a spherical sensor array 160. The array 160 includes a number of sensors 140 positioned on the spherical surface of the array 160. As an example, the spherical sensor array 160 may include 32 sensors 140, placed at known locations on the sphere (for example, approximately evenly spaced around the sphere). The sensors 140 on such an array 160 may be sensors that measure sound pressure, thus detecting the pressure of the sound at the different 32 points of the sphere. Using the measured sound pressure at these 32 points, the system may be able to infer a direction of incoming speech 180, thus detecting the direction of the speaker. While the techniques below are illustrated using a spherical array and specific relationships between points on a sphere, the illustrated methods are also applicable to non-spherical shapes, for example, partial spheres, round, but non-spherical shapes, or other configurations of sensor arrays.

As can be appreciated, to enable more precise and accurate calculations of the direction of the incoming speech 180 it is desirable to account for noise that may be present in the observed sound. Being able to account for such noise may lead to better results. However precisely separating the noise from the speech is difficult. To overcome this difficulty, certain assumptions may be made about the noise. First, a system 102 may assume that a noise component of a detected audio signal is spherically isotropic diffuse noise, namely noise that is evenly distributed across the sphere of the array 160. Using the assumption, the system 102 may determine (122) first entry values for a first noise covariance matrix (described below) based on the noise being assumed to be diffuse and based on the position of the sensors 140 on the surface of the array 160. This first noise covariance matrix may be predetermined, that is determined prior to detection of audio by the system 100. The system 102 may then detect (124) audio using the spherical array 160. The audio may include both a speech component (such as the incoming speech 180) and a noise component. The audio may be converted into an audio signal by the sensors of the array. The system 102 may then estimate (126) a noise intensity using an intensity of the audio signal. The detected signal intensity may be represented by a pressure detected by the sensors of the array, by a volume detected by the sensors of the array, or using some other observed value. The system 102 may then determine (128) second entry values for a second noise covariance matrix using the estimated noise intensity and the first noise covariance matrix. The second entry values may be the first entry values multiplied by an estimated value for the noise intensity, as described below. The system 102 may then estimate (130) the direction of arrival of the speech 180 using a Kalman filter (described below) and the second noise covariance matrix. Steps 122-130 may be performed by device 100 or by another, device (not illustrated) of system 102, for example a device configured to predetermine the first covariance matrix and provide that first covariance matrix to device 100. Thus, the system uses two components, the speech from the desired speaker and a diffuse noise component, and based on those two components estimates what pressure signals should be observed at each of the sensors on the spherical array. Then the system may estimate a direction of the speaker that makes what was observed at the sensors most closely match the model for diffuse noise and the speech. Further operations of the system, and a detailed explanation of steps 122-130, are described below.

State Inference and Observation Expression

As discussed above, the pressure may be measured at particular sensors on a sensor array. These pressure values are observable. From these observables, the system may infer the speaker direction. The direction of arrival of the desired speech at time k, also known as the state the system is attempting to infer, may be denoted by $x_k$. Equation 1 shows the inference of the state $x_k$:

$$x_k = x_{k-1} + u_{k-1} \tag{1}$$

where u is a noise term. Thus, the direction of the speaker at time k ($x_k$) can be inferred based on the direction of the speaker ($x_{k-1}$) at the previous time k−1 and the noise ($u_{k-1}$) at the previous time k−1.

The observation at time k may be denoted by $y_k$. Thus $y_k$ represents, based on the current state (i.e., the current direction of arrival of the desired speech), what the system is expected to observe (i.e., what the system should measure at the sensors). Equation 2 shows the observation $y_k$:

$$y_k = H_k(x_k) + v_k \qquad (2)$$

where $H_k(x_k)$ is the known, nonlinear observation functional and v is a noise term. The observation term $y_k$ is a vector of actual outputs from the individual sensors/microphones (for example, the 32 sensors of the array of FIG. 1). As shown in equation 2, the observation $y_k$ is equal to the predicted effect on the individual sensors/microphones of the desired sound wave (H) arriving from an expected state/direction of arrival of speech (x) plus noise, represented by noise term v.

Equations 1 and 2 may govern an extended Kalman filter (EKF) used to predict the state $x_k$. Generally, Kalman filtering is an algorithm that uses a series of measurements observed over time, containing random variations (such as noise) and other inaccuracies, and produces estimates of unknown variables (such as the direction of arrival of speech, $x_k$). An extended Kalman filter is the nonlinear version of the Kalman filter which linearizes about an estimate of the current mean and covariance. Equations 1 and 2 may be used by a Kalman filter or EKF to estimate the direction of arrival of speech.

In general, a Kalman filter may operate by determining how much weight to give to previous measurements versus model predictions when arriving at future estimates. That weight may be generally referred to as a Kalman Gain. Generally, a high gain places more weight on observed measurements, while a low gain places more weight on model predictions. One way of judging the effectiveness of the Kalman filter is to measure the error. In the situation of noise arriving at a spherical array discussed above, the error may be the difference between the actual observed measurements (y) and the predicted observation $H_k(x_k)$. Thus, the weighted square error ε at a particular time k and estimated position of incoming speech (θ, φ) (discussed below) may be expressed as:

$$\epsilon(\theta, \phi, k) \triangleq \sum_{l=0}^{L-1} \|y_{k,l} - H_k(x_k)\|_{V_k^{-1}}^2 \qquad (3)$$

where $y_{k,l}$ is the sensor output of from the spherical array at subband sample l and time k. As estimation is done in the frequency domain, each subband sample l is determined by taking a short time signal from each sensor and transforming it using a fast Fourier transform (FFT) to convert it to a subband sample in the frequency domain. The total sensor output may include a total of L subband samples. Thus the error may be measured across the subband samples l from subband sample 0 to subband sample L−1. The error ε is based on particular sensor locations on the array, as measured by angular values θ and φ, where $θ_s$ is the polar angle (i.e., inclination) and $φ_s$ is the azimuth of the location of an individual sensor S relative to the center of the spherical array.

As shown in Equations 1 and 2, both the state inference $x_k$ and the expected observation $y_k$ depend on noise terms, with u representing the noise in Equation 1 and v representing the noise in Equation 2. The noise terms u and v are assumed to be statistically independent, zero mean white Gaussian random vector processes. These noise terms represent real-world randomness that may be experienced when observing sound. Such randomness may be referred to as a stochastic process. Thus u represents the random movement of the speaker and v represents the random audio signal noise that may be observed by the sensors. Accounting for such randomness will allow the system to better infer the direction of the arrival of the desired speech.

Due to the random nature of the noise terms, however, it is difficult to precisely determine what the noise is from one moment in time (e.g., k−1), to the next (e.g., k). However, certain aspects of the noise may be predicted. For example, the noise u of the movement of the speaker is likely to be within a certain distance from one moment of time to the next (e.g., k−1 to k). Similarly, the expected noise v in the observed sound at different sensors may be estimated. Thus the system may assume covariance matrices of the noise terms, and use those covariance matrices when determine the state x using the Kalman filter. The covariance matrices are models of the randomness of the noise. Covariance is a measurement of how two random variables change together. Thus, covariance matrix $V_k$ is a representation of how much the noise variables represented in $v_k$ change across the sensors of the spherical array. $U_k$ and $V_k$ may be expressed as:

$$U_k = \varepsilon\{u_k u_k^H\} \qquad (4)$$

$$V_k = \varepsilon\{v_k v_k^H\} \qquad (5)$$

where ε is an expectation function. Using equation 5, the weighted square error of equation 3 may thus be expressed as:

$$\epsilon(\theta, \phi, k) \triangleq \sum_{l=0}^{L-1} \|y_{k,j} - H_k(x_k)\|_{V_k^{-1}}^2 = \sum_{i=0}^{L-1} [y_{k,i} - H_k(x_k)]^H V_k^{-1} [y_{k,1} - H_k(x_k)] \qquad (6)$$

A goal of the Kalman filter is to choose the a time sequence $\{x_k\}_k$ so as to minimize the summation over time of the weighted least square error:

$$\epsilon(\{\theta_k, \phi_k\}) \triangleq \sum_{k=0}^{K-1} \epsilon(\theta_k, \phi_k, k) \qquad (7)$$

under the constraint that $x_k \triangleq (\theta_k, \phi_k)$ (namely the expected direction of arrival of the desired sound expressed in terms of θ and φ) changes gradually over time. How quickly $x_k$ changes may be governed by covariance matrix $U_k$. Thus, based on an estimated direction of arrival of sound (x), the sound observed/measured at locations on the sphere (y) should match the sound expected at the locations on the sphere (H). If those two sound measurements do not sufficiently match (leading to high error) the state $x_k$ of the Kalman filter may be adjusted to reduce the error.

As can be seen in equation 6, the error is based on the covariance matrix $V_k$. The covariance matrix $V_k$ is a square Hermitian matrix with S×S parameters where S represents the number of sensors on the spherical array. To fully calculate the $V_k$ would involve individually calculating the covariance between each pair of sensors on the spherical array and then populating $V_k$ with those values. This is a difficult, if not impossible task, given the unknown precise value of the noise metric. As a result, in previous work $V_k$ was assumed to be diagonal and constant for ease of calculation of $V_k$. This assumption, however, is not correct and may lead to undesired performance due to the difference between the assumed $V_k$ and its correct value.

However the system may be improved by assuming $V_k$ to be a full matrix and non-constant (i.e., varying with time), which more closely resembles real-world conditions. As noted, determining values for a full matrix $V_k$ is a non-trivial problem. However, in the case of a spherical sensor array, the system may make use of the spherical properties of the sensor array, specifically certain known behaviors of sound as it impacts a sphere, to arrive at an improved estimate of $V_k$, which in turn will improve the Kalman filter results.

Offered is an improved method to determine $V_k$ based on certain assumptions of the observation noise $v_k$ and the configuration of the spherical array. In particular, a first set of values for a first noise covariance matrix V may be determined by assuming that the random variation modeled by the observation noise $v_k$ is due to spherically isotropic (SI), diffuse noise, namely noise that may be assumed to be arriving from all directions approximately uniformly to the spherical sensor array. For illustration, the hum of an air conditioner running in a room may be a diffuse noise (assuming the listener is not close to the output of the air conditioner itself). The first noise covariance matrix V may thus be determined ahead of time, i.e., prior to detecting sound by the spherical array at time k. A noise intensity value (that will be used to determine $V_k$) may then be estimated based on the data observed by the sensors at a time k, and the intensity value used to scale first noise covariance matrix V to arrive at an estimated (and second) noise covariance matrix $V_k$ that is used by the Kalman filter for state estimation. The various characteristics of sound impacting a sphere, and how those may be used to determine the values for first noise covariance matrix V, are explained below. That discussion is then followed by how the intensity value of $V_k$ may be estimated and how the estimated (and second) noise covariance matrix $V_k$ may be used by a Kalman filter to infer a state x, namely the direction of arrival of speech.

Figure 2:
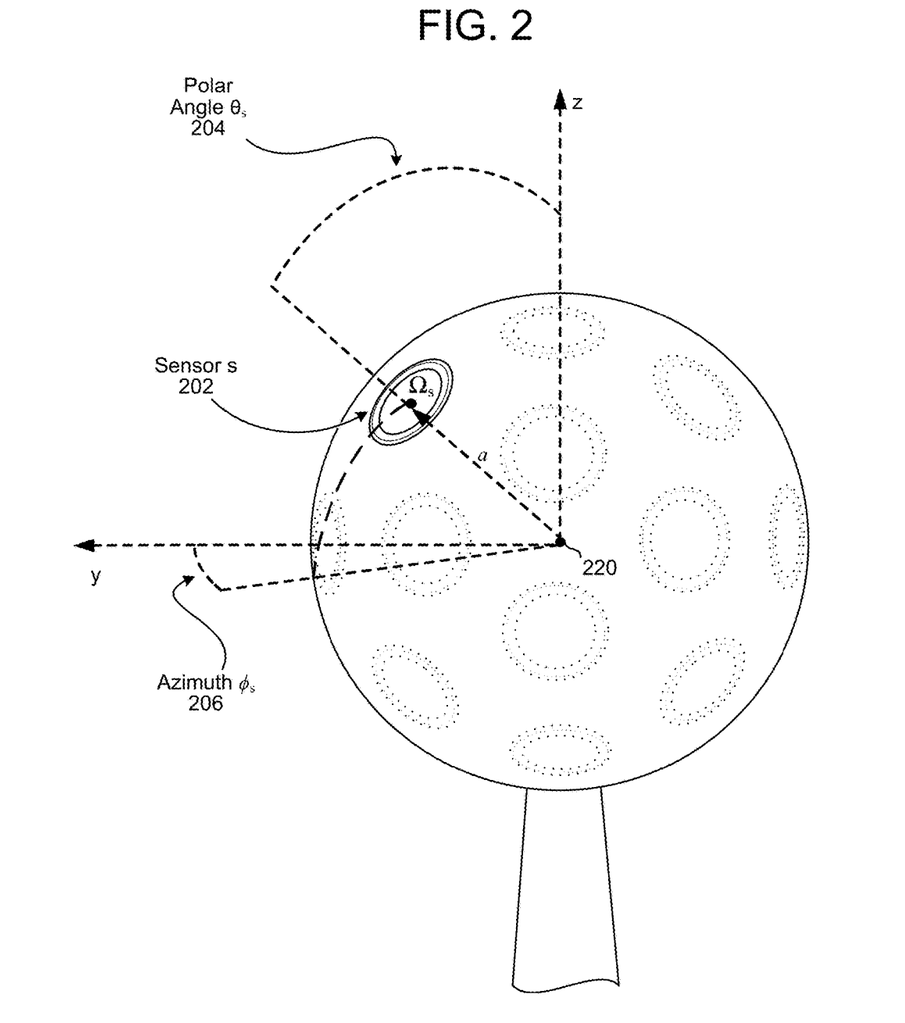
FIG. 2 illustrates a sensor on a spherical sensor/microphone array.

Estimating Observed Noise Covariance Based on Spherical Properties of the Sensor Array To estimate the direction of arrival of speech, the observed sound at various points on the sphere is taken into account. The behavior of a plane wave (such as sound) impinging on a rigid sphere (such as the spherical sensor array) may be described by an array manifold vector. The array manifold vector includes a representation of the value of the pressure from the sound measured at each sensor in the spherical array. When a sound wave hits a spherical surface, the sound wave scatters. The array manifold vector describes the effect the on the spherical surface of the sound wave scattering. The pressure of the sound G, may be different for each sensor location $\Omega_N$ where S is the number of the sensor. Thus, if there are S sensors in the spherical array, the sensors are represented by $\Omega_0, \Omega_1, \ldots \Omega_{S-1}$. The actual position $\Omega_N$ of each sensor/microphone on the sphere is measured by polar angle $\theta$ and azimuth $\phi$, of each respective sensor/microphone relative to the defined axes of a spherical coordinate system for the array. For example, as shown in FIG. 2, sensor s 202 is located at position $\Omega_s$, which is defined by polar angle $\theta_s$ 206 and azimuth $\phi_s$ 206, where 220 is the center of the sphere of radius $\alpha$, $\theta_s$ is measured from the north pole reference axis z and $\phi_s$ is measured from the azimuth reference axis y. Axes z and y may be defined/configured as desired by the system to provide a coordinate reference system.

Figure 3:
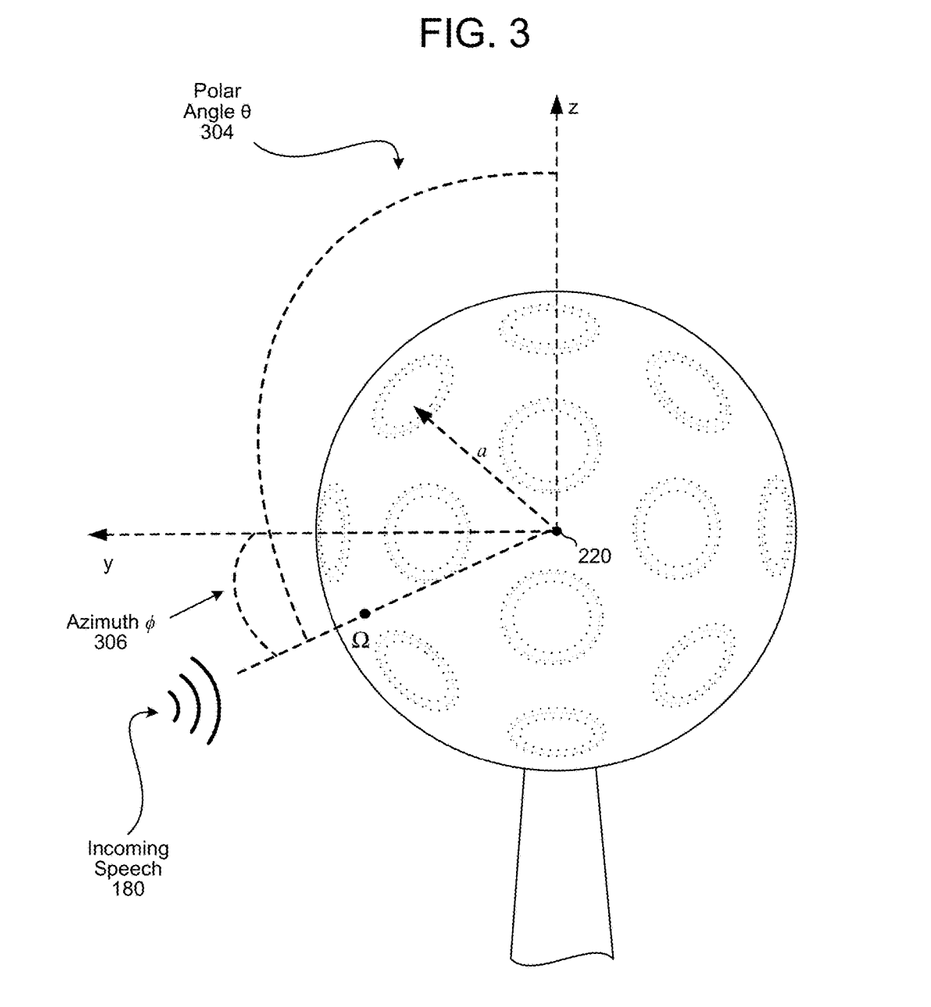
FIG. 3 illustrates a direction of arrival of speech relative to a spherical sensor/microphone array.

The direction of arrival of the speech is also represented in the array manifold vector. As noted above, the state $x_k$ that the Kalman filter is attempting to determine is this same direction of arrival of the speech. In the array manifold array vector the direction of arrival is represented by $\Omega$. Thus, $x_k = \Omega$. $\Omega$ is also measured by angular values $\theta$ and $\phi$, thus representing the direction of the arrival of the speech relative to the center of the spherical sensor array. For example, as shown in FIG. 3, if the incoming speech 180 is estimated to be arriving at the sphere at point $\Omega$, the arrival point may be represented by angular values $\theta$ 304 and $\phi$ 306. Thus the array manifold vector describes what pressure should be experienced at each sensor location given a particular sound wave and a specific direction of arrival. The array manifold vector may be expressed as:

$$g(fa, \Omega) \triangleq \begin{bmatrix} G(fa, \Omega_0, fa, \Omega) \\ G(fa, \Omega_1, fa, \Omega) \\ \vdots \\ G(fa, \Omega_{S-1}, fa, \Omega) \end{bmatrix} \quad (8)$$

where $\alpha$ is the radius of the sphere, f is the wave number of the incoming sound (i.e., $2\pi/\lambda$ where $\lambda$ is the wavelength), $\Omega_N$ is the position on the sphere of sensor N, $\Omega$ is the expected position of arrival of the sound on the sphere, and G is the wave that results from sound scattering on the rigid sphere. G may be given by the equation:

$$G(fa, \theta) - \sum_{n=0}^{\infty} i^n (2n+1) b_n(fa) P_n(\cos\theta) \quad (8A)$$

G represents the sound pressure field for a plane sound wave impinging on a rigid sphere. Further, for a particular Kalman filter state $x_k$ (where $x_k \triangleq \Omega = (\theta, \phi)$), the observation function providing the predicted observation $\hat{y}_{k,l}$ can thus be expressed as:

$$\hat{y}_{k,l} \triangleq H(x_k) = B_{k,l} x_{k,l}(fa, \Omega) e^{i\omega_l Dk} \quad (9)$$

where $B_{k,l}$ is the l th subband component of the desired speech at time step k and $e^{i\omega_l Dk}$ represents the time variation of the subband sample.

Certain characteristics of a plane sound wave impacting a rigid spherical surface (such as that of a spherical sensor array) laid out above are based on various previous work described in the following publications, which are herein incorporated by reference in their entireties:

J. McDonough, K. Kumatani, T. Arakawa, K. Yamamoto, and B. Raj, "Speaker tracking with spherical sensor arrays," in Proc. ICASSP, Vancouver, Canada, May 2013

E. Fisher and B. Rafaely, "Near-field spherical microphone array processing with radial filtering," IEEE Transactions on Audio, Speech and Language Processing, pp. 256-265, November 2011.

J. R. Driscoll and J. Dennis M. Healy, "Computing Fourier transforms and convolutions on the 2-sphere," Advances in Applied Mathematics, vol. 15, pp. 202-250, 1994.

As mentioned above, the first noise covariance matrix V may be determined by assuming that the random variation modeled by the observation noise v is due to spherically isotropic, diffuse noise. Spherically isotropic (SI) noise is, by definition, uniform sound arriving from all directions with a uniform power density of $\sigma_{SI}^2$. This is explained further in G. W. Elko, "Spatial coherence functions for differential sensors in isotropic noise fields," in Microphone Arrays, M. Brandstein and D. Ward, Eds. Heidelberg, Germany: Springer Verlag, 2001, ch. 4, which is hereby incorporated by reference in its entirety. The directions of arrival of the plane wave are represented by $\Omega$, where, as noted above, $\Omega$ is measured by polar angle $\theta$ and azimuth $\phi$, both relative to the center of the sphere, allowing $\Omega$ to also be expressed as $(\theta, \phi)$. Thus, for a rigid sphere with a radius of $\alpha$, and a wave number f, the inter-sensor covariance matrix of SI noise on a spherical sensor array may be expressed as:

$$\sum_{SI}(fa) \triangleq \int_0^{2\pi}\int_0^{\pi} \varepsilon\{v(fa, \theta, \phi)v^H(fa, \theta, \phi)\}\sin\theta d\theta d\phi \quad (10)$$

Figure 4:
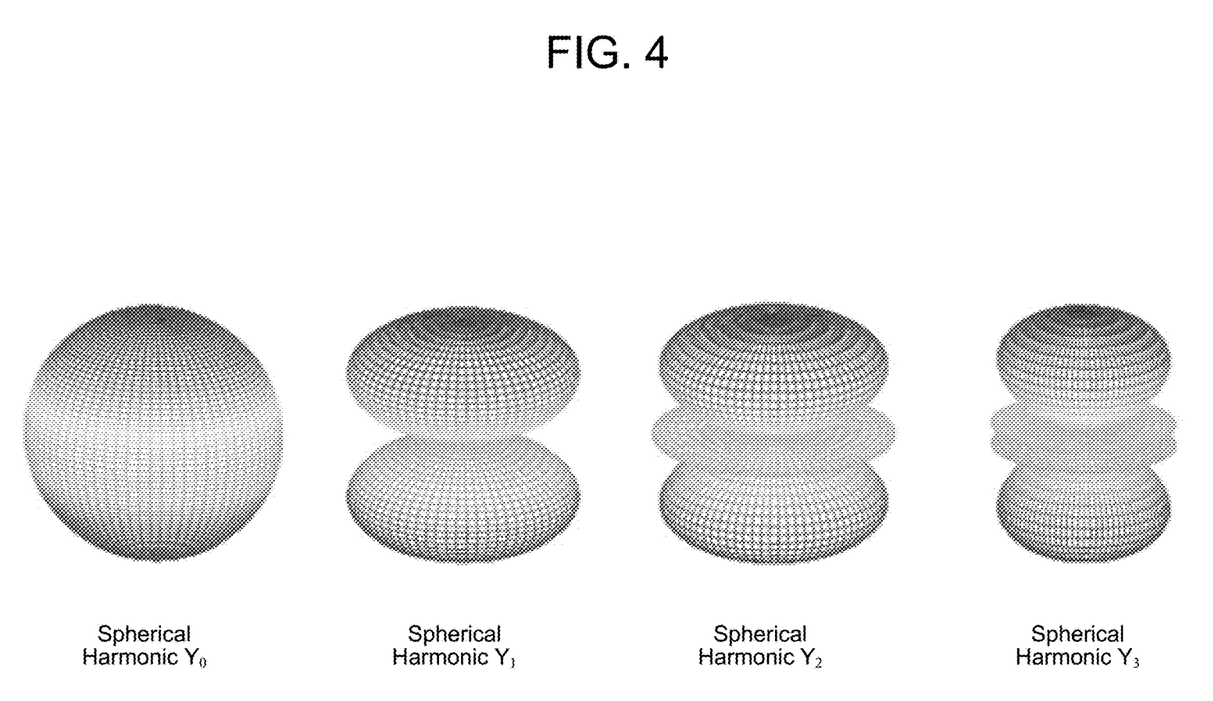
FIG. 4 illustrates spherical harmonics.

If the array manifold vector of equation 8 is substituted into equation 10, and the expectation and integration is performed for equation 10, the (s,s')th component of $\Sigma(f\alpha)$ (namely the covariance between points $\Omega_s$ and $\Omega_{s'}$ on the sphere of radius $\alpha$ for a sound wave of wave number f) may be expressed as:

$$\sum_{SI}(fa, s, s') = \bar{\sigma}_{SI}^2 \sum_{n=0}^{\infty} |b_n(fa)|^2 \sum_{m=-n}^{n} Y_n^m(\Omega_s)\bar{Y}_n^m(\Omega_{s'}) \quad (11)$$

where:

$$\bar{\sigma}_{SI}^2 = 16\pi^2 \sigma_{SI}^2,$$

$$Y_n^m,$$

is the spherical harmonic of order n and degree m (as explained in the Driscoll and Healy (1994) reference discussed above), and $\bar{Y}$ is the complex conjugate of Y, and $b_n$ is the $n^{th}$ modal coefficient of the spherical harmonics for sound impacting a surface of a sphere. Spherical harmonics play a similar role to a function defined on a surface of a sphere as sine and cosine or complex exponentials play for a periodic function defined on the real number line. That is, as a periodic function on the real line may be expanded as a complex exponential series, a function on a sphere may be expanded as a series of spherical harmonics. An illustration of spherical harmonics is shown in FIG. 4. Equation 11 thus shows the form of the first values that may be used to populate the observation noise covariance matrix V as individual values for V=$\Sigma_{SI}$ for spherically isotropic noise per equation 11.

Figure 5:
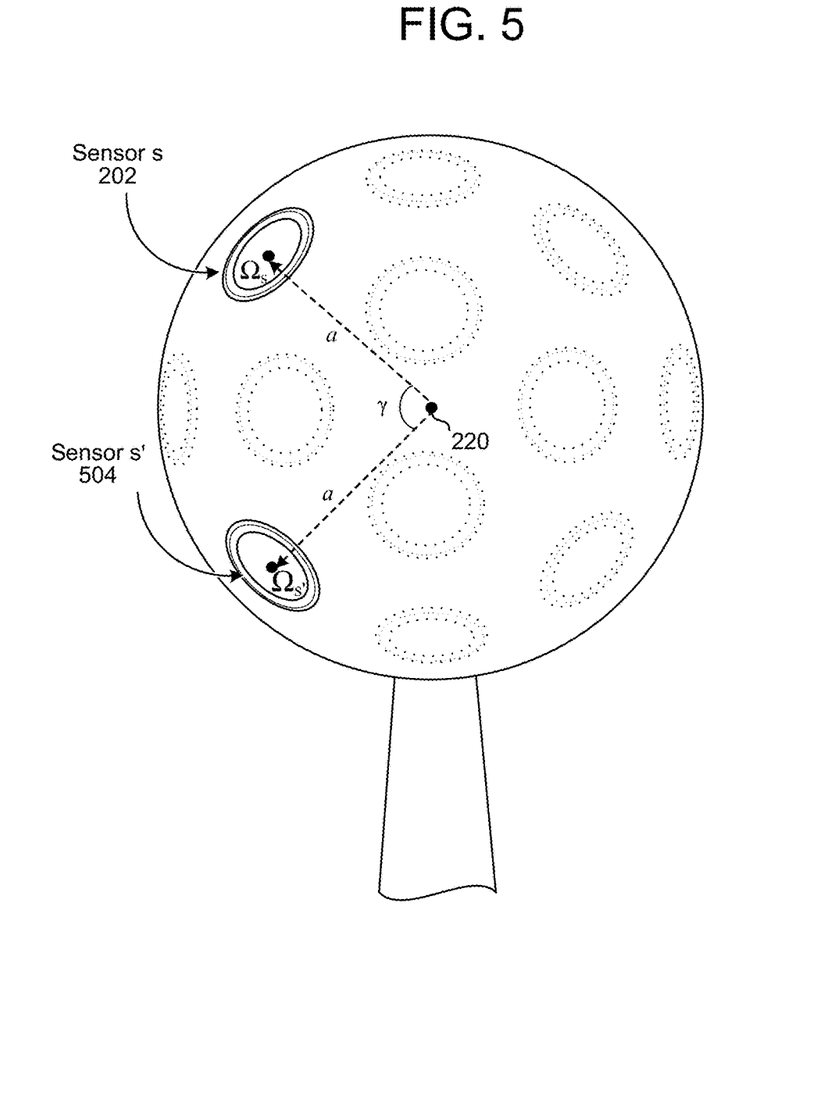
FIG. 5 illustrates a relative angle between sensors on a spherical sensor/microphone array.

Further taking into account the spherical nature of the sensor array, equation 11 may be refined to allow for improved estimation of the covariance matrix $V_k$, thus resulting in improved estimation of the arrival of the detected speech. The addition theorem for the pressure function showing the expansion of spherical harmonics on the sphere can be expressed as:

$$P_n(\cos\gamma) = \frac{4\pi}{2n+1}\sum_{m=-n}^{n} Y_n^m(\theta_s, \phi_s)\bar{Y}_n^m(\theta_{s'}, \phi_{s'}) \quad (12)$$

where $\gamma$ is the angular offset between two points $\Omega_s$ $(\theta_s, \phi_s)$ 202 and $\Omega_s'$ $(\theta_{s'}, \phi_{s'})$ 504 on the sphere of radius $\alpha$ as illustrated in FIG. 5. Equation 12 may be substituted into Equation 11, thus expressing $\Sigma_{SI}$ as:

$$\sum_{SI}(fa, \gamma) = 16\pi^2 \sigma_{SI}^2 \sum_{n=0}^{\infty} |b_a(fa)|^2 P_n(\cos\gamma)\frac{2n+1}{4\pi} = \quad (13)$$

$$4\pi\sigma_{SI}^2 \sum_{a=0}^{\infty}(2n+1)|b_n(fa)|^2 P_n(\cos\gamma)$$

Equation 13 shows the relation of covariance between various points on a sphere. Namely, equation 13 shows that the covariance between any two points depends on their angular separation $\gamma$, the radius of the sphere $\alpha$, and the wave number f (that essentially normalizes frequency). The self-variances of the outputs of all sensors/microphones on the spherical array are equal. Equation 13 does not depend on the direction of arrival of the noise because the noise is assumed to be diffuse, i.e., arriving from all directions simultaneously with equal intensity. As noted in equation 13, each individual entry of the noise covariance matrix may depend on the radius of the sphere of the array ($\alpha$), the wave number (f), the angular offset ($\gamma$) between the sensor locations whose covariance is represented by the particular matrix entry, and power density $\sigma_{SI}^2$. What equation 13 does not say is the actual noise intensity itself. The noise intensity is the expectation of the square of the pressure field that's arriving at each sensor, namely the power density $\sigma_{SI}^2$. Because the power density $\sigma_{SI}^2$ is initially unknown, it may be initially removed from the estimated noise covariance matrix and then replaced when a value is known (as discussed below). Thus, a first noise covariance matrix may be determined (as described above in reference to step 122), using equation 13 (with $\sigma_{SI}^2$ removed), where the first noise covariance matrix includes first values for the individual matrix entries and the first values do not depend on the power density or intensity of incoming sound.

With the first noise covariance matrix (and the individual first values of the matrix) determined, the noise intensity may be incorporated later when incoming speech is detected by the sensor array. As detailed below, the noise intensity may be estimated using the observed sound, including the intensity of the observed sound (as described above in reference to step 124) thus completing the estimate for a covariance matrix of the spherical array. The intensity of the observed sound may be based on pressure, volume, or other sound characteristics measured by the sensors of the array.

First, the sensor self-variance $\bar{\sigma}_{SI}^2$ may be chosen using a maximum likelihood (ML) criterion. Assuming that acoustic observation $y_{k,l}$ at time step k and subband l has a multi-dimensional Gaussian probability density function given by:

$$\mathcal{N}\left(y_{k,l}; \mu_{k,l}(\Omega), \overline{\sigma}_{Sl}^2, \sum_{Sl}\right) \triangleq \qquad (14)$$

$$\frac{1}{\sqrt{\left|2\pi\overline{\sigma}_{Sl}^2 \sum_{Sl}\right|}} \exp\left\{-\frac{1}{2\overline{\sigma}_{Sl}^2}[y_{k,l} - \mu_{k,l}(\Omega)]^H \Sigma_{Sl}^{-1}[y_{k,l} - \mu_{k,l}(\Omega)]\right\}$$

where $\mu_{k,l}(\Omega) \triangleq g_{k,l}(\Omega)B_{k,l}e^{iw_lDk}$ where $B_{k,l}$ is the intensity of the speech, $g_{k,l}(\Omega)$ is the array manifold vector for sphere location $\Omega$ at time k and subband l (see below). Taking the natural logarithm of both sides, yields:

$$\log \mathcal{N}(y_{k,l}: \ldots) = -\frac{1}{2}\left\{S\log 2\pi + S\log \alpha + \log\left|\sum_{Sl}\right| + \frac{1}{\alpha}[y_{k,l} - \mu_{k,l}(\Omega)]^H \Sigma_{Sl}^{-1}[y_{k,l} - \mu_{k,l}(\Omega)]\right\} \qquad (15)$$

where $\alpha$ is defined to be $\overline{\sigma}_{Sl}^2$, the intensity of the diffuse noise for subband l. Thus equations 14-15 are used to derive the intensity of the diffuse noise.

Summing equation 10 over K samples in a training set, taking the derivative with respect to $\alpha$ and equating to zero yields the maximum likelihood estimate of $\alpha$, namely:

$$\hat{\alpha} = \frac{2}{KS}\sum_{k=0}^{K-1}[y_{k,l} - \mu_{k,l}(\Omega)]^H \Sigma_{Sl}^{-1}[y_{k,l} - \mu_{k,l}(\Omega)] \qquad (16)$$

where $\hat{\alpha}$ is the estimated value of the intensity $\alpha$, also called the variance. A further assumption may be made that the instantaneous power of the diffuse noise varies, but slowly. Thus a running estimate at sample K of $\alpha$ may be expressed as:

$$\hat{\alpha}(K) \triangleq \beta\hat{\alpha}(K-1) + \frac{1-\beta}{S}[y_{K,l} - \mu_{K,l}(\Omega)]^H \Sigma_{Sl}^{-1}[y_{K,l} - \mu_{K,l}(\Omega)] \qquad (17)$$

Thus equation 17 shows that $\hat{\alpha}$ (the estimated value of $\alpha$) at a particular time (K) depends on the value of $\hat{\alpha}$ at the previous time (K-1), adjusted by a weighting factor $\beta$, where $0<\beta<1$, and S is the number of sensors of the array. The weighting factor may be adjusted depending on how heavily the system should weight previous samples. The value $y_{K,l}$ represents the observed data at subband l and the value $\mu_{K,l}$ represents the predicted data based on the model of speech impinging on the spherical surface at subband l. As can be appreciated from equation 17, if $\beta$ is set to 1, the current estimate $\hat{\alpha}(K)$ would be equal to the previous estimate $\hat{\alpha}(K-1)$. If $\beta$ is set to 0, the current estimate $\hat{\alpha}(K)$ would be equal to the second half of equation 17, which is the new set of observed data (i.e., the observed signal intensity) compared to the predicted data. Thus, the estimated intensity may be based on a weighted previous intensity ($\beta\hat{\alpha}(K-1)$) plus a weighted observed signal intensity.

The estimate $\hat{\alpha}$ may be used as the estimated intensity of the diffuse noise, as referenced above in step 126. This intensity estimate $\hat{\alpha}$ may be used to adjust the first values of the first noise covariance matrix (described above in reference to equations 11-13) to estimate the second (and ultimate) covariance matrix $V_k$ as described above in reference to step 128. Each of the first values of the first noise covariance matrix may be multiplied by the intensity estimate $\hat{\alpha}$ to arrive at the second values of the second noise covariance matrix. The new estimated (i.e., second) covariance matrix $V_k$ may now be used by the Kalman filter to estimate the direction of the arrival of speech as explained below.

Estimating Speech Direction

The offered estimates for the covariance matrix $V_k$ may be used with a number of different techniques for estimating the arrival direction of speech using a Kalman filter. One example of estimating speech direction is discussed here, but others may be used.

As discussed above, a Kalman filter may be configured to reduce an squared-error metric to more accurately predict the arrival direction of the speech. The squared-error metric at time step k may be expressed as:

$$\epsilon(\theta, \phi, k) \triangleq \sum_{l=0}^{L-1} \|y_{k,l} - g_{k,l}(\theta, \phi)B_{k,l}e^{iw_lDk}\|^2 \qquad (18)$$

where $g_{k,l}(\theta, \phi)$ is the model for sensor outputs for sphere location $(\theta, \phi)$ at time k and subband l is the array-manifold vector, namely:

$$g_{k,l}(\theta, \phi) \triangleq \begin{bmatrix} G(fa, \theta_0, \phi_0, fa, \theta, \phi) \\ G(fa, \theta_1, \phi_1, fa, \theta, \phi) \\ \vdots \\ G(fa, \theta_{S-1}, \phi_{S-1}, fa, \theta, \phi) \end{bmatrix} \qquad (19)$$

where $\theta_s$ and $\phi_s$ with subscripts represent the location of sensors on the array, $\theta$ and $\phi$ without subscripts represent the expected direction of arrival of speech, and G is described above in Equation 8A.

The maximum likelihood estimate of $B_{k,l}$ is given by:

$$\hat{B}_{k,l} = \frac{g_{k,l}^H(\theta, \phi)y_{k,l}}{\|g_{k,l}(\theta, \phi)\|^2} \cdot e^{-iw,DK} \qquad (20)$$

An extended Kalman filter may (a) estimate the scale factors in $B_{k,l}$ as given in equation 20. This estimate may be used to (b) update the state estimates ($\hat{\theta}_k, \hat{\phi}_k$) of the Kalman filter. The system may then perform an iterative update for each time step (by repeating steps (a) and (b)) as in the iterated extended Kalman filter described by M. Wolfel and J. McDonough, Distant Speech Recognition. London: Wiley, 2009 in §4.3.3.

State Estimation Using Kalman Filter and Estimated Noise Covariance

Figure 6:
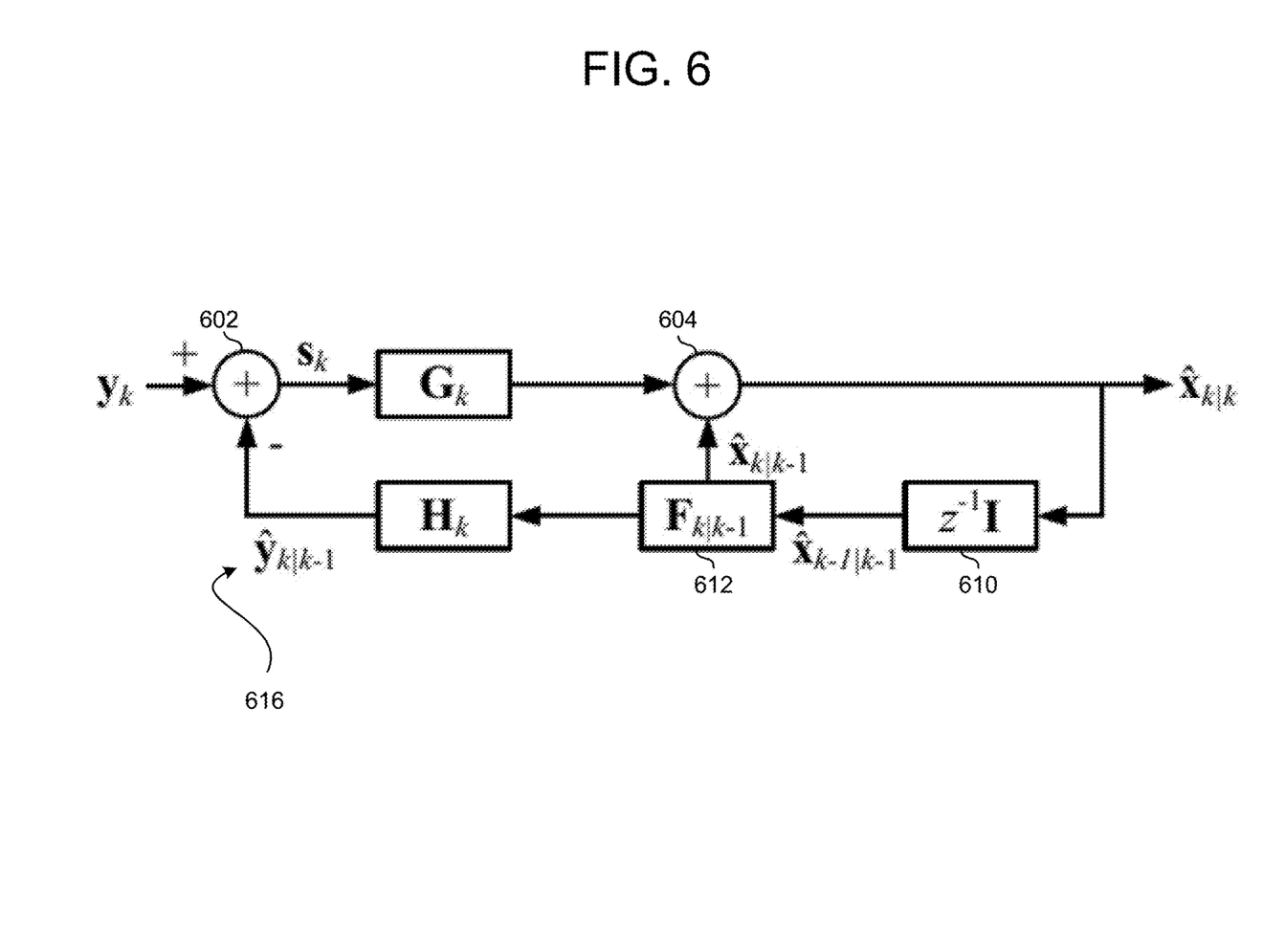
FIG. 6 illustrates operation of a Kalman filter according to one embodiment of the present disclosure.

As mentioned above, the Kalman filter operates to determine how much previous observations should be weighted when estimating the desired state x, namely the direction of arrival of the speech detected by the spherical array. The Kalman filter may operate in a number of ways using the estimated noise covariance $V_k$ described above. An extended Kalman filter (EKF) is used to illustrate the Kalman filter operation in conjunction with FIG. 6 and the description below. FIG. 6 shows various calculations performed by the Kalman filter to arrive at the estimated state $x_{k|k}$.

Starting at the right hand side of FIG. 6, an estimate $\hat{x}_{k|k}$ is passed into a delay component 610, and as the time step k advances, the estimate at time k becomes the estimate at time k−1, namely $\hat{x}_{k-1|k-1}$. This now previous estimate is adjusted by the transition matrix $F_{k|k-1}$ 612. Where the transition matrix $F_{k|k-1}$ adjusts the previous estimate by a weight based on how much the Kalman filter should value the previous estimate as compared to the current observation. The current observation ($y_k$) is the data observed at the sensors/microphones of the spherical array at time k. Let $y_{1:k-1}$ represent all past observations from the sensors/microphones of the spherical array up to time k−1. Let $y_{k|k-1}$ 616 denote the minimum mean square error estimate of the next observation $y_k$ given all prior observations, such that:

$$\hat{y}_{k|k-1} = \varepsilon\{y_k \mid y_{k:k-1}\} \tag{21}$$

By definition, the innovation at time k ($s_k$) is the difference between the current observation ($y_k$) and the expected observation $$(\hat{y}_{k|k-1}),$$

namely $$s_k \triangleq y_k - \hat{y}_{k|k-1}$$

as shown at node 602. Namely, the innovation represents the difference between the data actually observed and the data that the system expected to observe, given the estimated state/direction of arrival of speech. The predicted observation may be calculated based on the current state estimate according to $$\hat{y}_{k|k-1} = H_k(\hat{x}_{k|k-1}).$$

Hence, $s_k$ may be expressed as $$s_k = y_k - H_k(\hat{x}_{k|k-1})$$

which implies:

$$s_k = \overline{H}_k(\hat{x}_{k|k-1})\varepsilon_{k|k-1} + v_k \tag{22}$$

where $$\epsilon_{k|k-1} = x_k - \hat{x}_{k|k-1}$$

is the predicted state estimate error at time k, using all data up to time k−1, and $$\overline{H}_k(\hat{x}_{k|k-1})$$

is me linearization or $H_k(x)$ about $x=x_{k|k-1}$.

$\epsilon_{k|k-1}$ is orthogonal to $u_k$ and $v_k$. Thus, the covariance matrix S of the innovation sequence s can be expressed as:

$$S_k \triangleq \varepsilon\{s_k b^{(x)H}_k\} = \overline{H}_k(\hat{x}_{k|k-1})K_{k|k-1}\overline{H}_k(\hat{x}_{k|k-1}) + V_k, \tag{23}$$

where the predicted state estimation error covariance matrix is defined as:

$$K_{k|k-1} \triangleq \varepsilon\{\epsilon_{k|k-1}\epsilon^H_{k|k-1}\} \tag{24}$$

As can be seen in equation 23, the covariance matrix $S_k$ depends on the covariance matrix $V_k$. As explained above, $V_k$ may be estimated as described above. In particular, first values for a first covariance matrix V may be determined by estimating that the noise is a spherically isotropic noise. The first values may be adjusted by an estimated noise intensity $\hat{\alpha}$ to determine second values for the second covariance matrix $V_k$. The intensity $\hat{\alpha}$ may be estimated as described in equation 17. Thus the second noise covariance matrix $V_k$ may be used to improve the operation of the Kalman filter. Continuing the description of the Kalman filter, the Kalman Gain $G_k$ can be calculated as:

$$G_k = K_{k|k-1}\overline{H}^H_k(x_{k|k-1})S_k^{-1} \tag{25}$$

According to the Riccati equation, $K_{k|k-1}$ can be sequentially updated as:

$$K_{k|k-1} = F_{k|k-1}K_{k-1}F^H_{k|k-1} + U_{k-1} \tag{26}$$

The matrix $K_k$ may be obtained through the recursion:

$$K_k = K_{k|k-1} - G_kH_kK_{k|k-1} = (I - G_kH_k)K_{k|k-1} \tag{27}$$

$K_k$ may be interpreted as the covariance matrix of the filtered state estimate error, such that $$K_k \triangleq \{\epsilon_k\epsilon^H_k\}$$

where $$\epsilon_k = x_k - \hat{x}_{k|k}.$$

The filtered state estimate is given by:

$$\hat{x}_{k|k} = \hat{x}_{k|k-1} + G_ks_k \tag{28}$$

as shown in node 604. Thus, the new estimated state $\hat{x}_{k|k}$ is based on the previous estimated state $\hat{x}_{k|k-1}$ plus an adjustment value equal to the Kalman Gain $G_k$ multiplied by the innovation $s_k$. And as noted, the Kalman Gain $G_k$ is based on the estimated noise covariance $V_k$ determined as explained above. Thus, during estimation of the current state (i.e., the estimated direction of arrival of speech), the weight given to the current observed data is based on the estimated noise covariance $V_k$, thus estimating the direction of arrival of speech as described above in reference to step 130.

Figure 7:
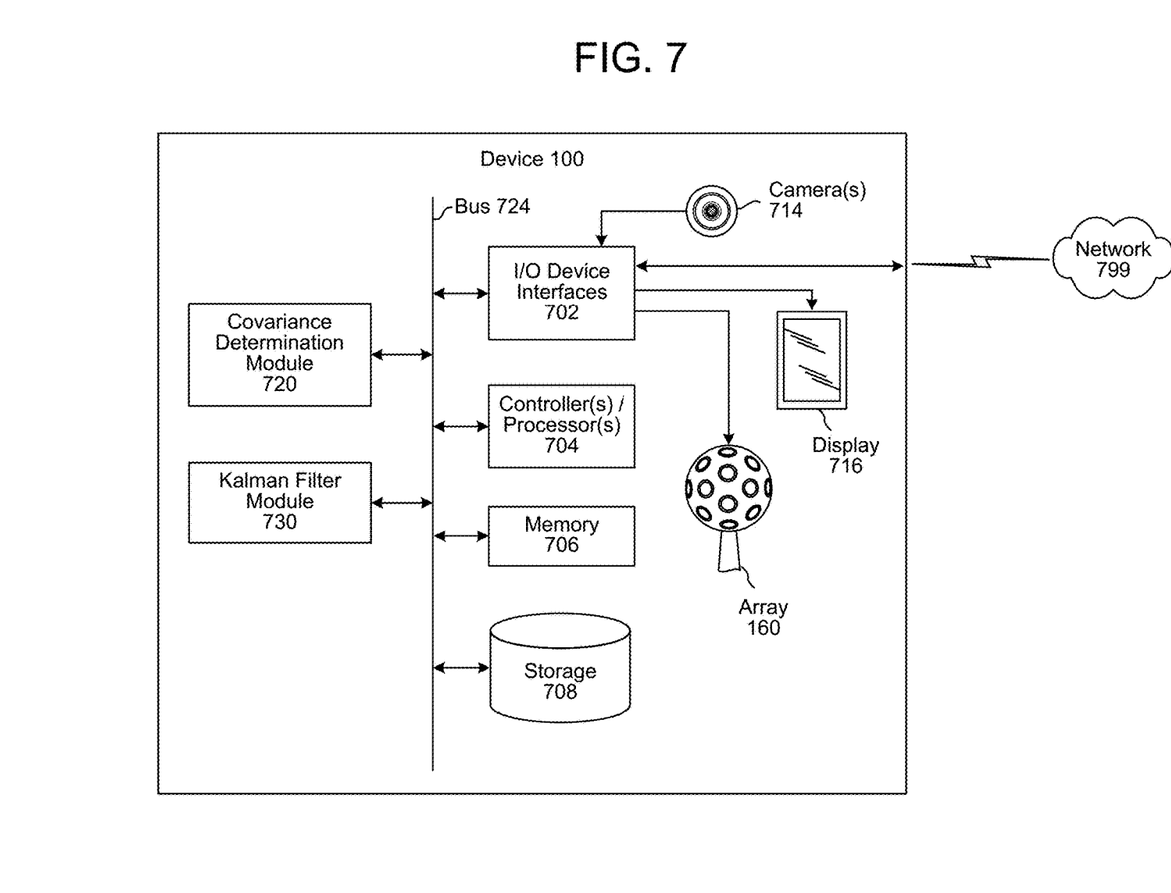
FIG. 7 illustrates components of a device for estimating a direction of arrival of speech using a spherical sensor/microphone array according to one embodiment of the present disclosure.

FIG. 7 is a block diagram conceptually illustrating example components of the device 100. In operation, the device 100 may include computer-readable and computer-executable instructions that reside on the device 100, as will be discussed further below.

The device 100 may include, among other things a spherical sensor array 160. The sensors 140 of the array 160 may include pressure sensors, microphones, or other sensors 140 capable of detecting sound. The sensors 140 will provide the observed data described above to estimate the direction of arrival of speech.

The device 100 may also include other input components, such as a video input device such as camera(s) 714. The video input may be used to enhance the speaker tracking The device 100 may also include video output device for displaying images, such as display 716. The video output device may be a display of any suitable technology, such as a liquid crystal display, an organic light emitting diode display, electronic paper, an electrochromic display, or other suitable component(s).

The device 100 may include an address/data bus 724 for conveying data among components of the device 100. Each component within the device 100 may also be directly connected to other components in addition to (or instead of) being connected to other components across the bus 724.

The device 100 may include one or more controllers/processors 704, that may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The device 100 may also include a data storage component 708, for storing data and controller/processor-executable instructions (e.g., instructions to perform the algorithms illustrated in FIG. 1 and the equations presented above). The data storage component 708 may include one or more non-volatile storage types such as magnetic storage, optical storage, solid-state storage, etc. The device 100 may also be connected to removable or external non-volatile memory and/or storage (such as a removable memory card, memory key drive, networked storage, etc.) through the input/output device interfaces 702.

Computer instructions for operating the device 100 and its various components may be executed by the controller(s)/processor(s) 704, using the memory 706 as temporary "working" storage at runtime. The computer instructions and a table storing the jitter constant β may be stored in a non-transitory manner in non-volatile memory 706, storage 708, or an external device. Alternatively, some or all of the executable instructions may be embedded in hardware or firmware in addition to or instead of software.

The device 100 includes input/output device interfaces 702. A variety of components may be connected through the input/output device interfaces 702, such as the array 160, the camera(s) 714 and the display 716. The input/output device interfaces 702 may also include an interface for an external peripheral device connection such as universal serial bus (USB), FireWire, Thunderbolt or other connection protocol. The input/output device interfaces 702 may also include a connection to one or more networks 799 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The covariance determination module 720 performs the processes and calculations disclosed above in determining/estimating the first values of the first noise covariance matrix, the noise intensity, and the second values of the second noise covariance matrix. The covariance determination module 720 may receive data from the array 160. The covariance matrix determination module 720 may also receive a predetermined first noise covariance matrix from a different device (not pictured).

The Kalman filter module 730 performs processes and calculations disclosed above in estimating the direction of arrival of the speech.

The concepts disclosed herein may be applied within a number of different devices and computer systems, including, for example, set top boxes, audio detectors for accepting spoken commands, other devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of mobile computers, orientation filters, and inertial navigation systems should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, portions of the orientation filter 730 may be implemented in hardware, such arithmetic logic to apply the various vector matrix transforms.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for estimating a direction of arrival of detected speech using a spherical microphone array, the computer-implemented method comprising:
    determining, at a first time, a first noise covariance matrix comprising a plurality of first values, wherein each of the first values describes a covariance between a pair of microphones detecting diffuse noise, wherein the microphones are part of a spherical microphone array;
    detecting, at a second time after the first time, audio using the spherical microphone array;

determining a signal from the audio using the spherical microphone array, wherein the signal comprises a speech component and a noise component and the signal has a signal intensity calculated from pressure detected by the spherical microphone array;

estimating, based on the signal intensity, an estimated noise intensity of the noise component;

multiplying the estimated noise intensity by the plurality of first values to obtain a plurality of second values, wherein a second noise covariance matrix includes the plurality of second values; and estimating a direction of arrival of the speech component relative to the spherical microphone array using an extended Kalman filter and the second noise covariance matrix.

2. The computer-implemented method of claim 1, wherein determining the first noise covariance matrix comprises:

determining an angular offset between a first position of a first microphone on the spherical microphone array and a second position of a second microphone on the spherical microphone array;

determining a radius of the spherical microphone array;

determining a wave number of diffuse noise;

calculating a first covariance value using the angular offset, the radius and the wave number; and including the first covariance value as one of the plurality of first values.

3. The computer-implemented method of claim 1, wherein estimating the estimated noise intensity comprises:

determining a previous estimated noise intensity;

adjusting the previous estimated noise intensity by a first weighting factor to determine a weighted previous estimated noise intensity;

adjusting the signal intensity by a second weighting factor to determine a weighted signal intensity; and calculating the estimated noise intensity by adding the weighted previous estimated noise intensity to the weighted signal intensity.

4. The computer-implemented method of claim 1, wherein estimating the estimated noise intensity $\hat{\alpha}$ at time K comprises evaluating the equation:

$$\hat{\alpha}(K) \triangleq \beta\hat{\alpha}(K-1) + \frac{1-\beta}{S}[y_{K,l} - \mu_{K,l}(\Omega)]^H \Sigma_{Sl}^{-1}[y_{K,l} - \mu_{K,l}(\Omega)]$$

where $\hat{\alpha}$ (K−1) is a previous estimate of a noise intensity, $\beta$ is a weighting factor, $y_{K,l}$ is sound data detected by the spherical microphone array at subband l, S is a number of sensors in the spherical microphone array, $\mu_{(K,l)}(\Omega)$ is predicted data based on a model of speech impinging on a spherical surface at subband l, and $$\Sigma_{Sl}^{-1}$$

is an unscaled covariance matrix.

5. A system comprising:

a sensor array comprising a plurality of sensors, the plurality of sensors configured to detect sound;

at least one processor; and a memory including instruction operable to be executed by the at least one processor to perform a set of actions comprising:

determining an audio signal using the sensor array, the audio signal having a signal intensity and comprising a speech component and a noise component;

estimating, based on the signal intensity, an estimated noise intensity of the noise component;

determining a first noise covariance matrix comprising a plurality of first values, wherein each of the first values describes a covariance between a pair of sensors of the sensor array;

multiplying the estimated noise intensity by the first noise covariance matrix to obtain a second noise covariance matrix; and estimating a direction of arrival of the speech component relative to the sensor array using a Kalman filter and the first noise covariance matrix and the second noise covariance matrix.

6. The system of claim 5, wherein the sensor array is generally spherical and the plurality of sensors are located proximate to a surface of the sensor array.

7. The system of claim 6, wherein determining the first noise covariance matrix comprises:

determining an angular offset between a first position of a first sensor of the sensor array and a second position of a second sensor of the sensor array;

determining a radius of the sensor array;

determining a wave number of diffuse noise;

calculating a first covariance value using the angular offset, the radius and the wave number; and including the first covariance value as one of the plurality of first values.

8. The system of claim 5, wherein estimating the estimated noise intensity comprises:

determining a previous estimated noise intensity;

adjusting the previous estimated noise intensity by a first weighting factor to determine a weighted previous estimated noise intensity;

adjusting the signal intensity by a second weighting factor to determine a weighted signal intensity; and calculating the estimated noise intensity by adding the weighted previous estimated noise intensity to the weighted signal intensity.

9. The system of claim 5, wherein the estimated noise intensity $\hat{\alpha}$ at time K is given by the equation:

$$\hat{\alpha}(K) \triangleq \beta\hat{\alpha}(K-1) + \frac{1-\beta}{S}[y_{K,l} - \mu_{K,l}(\Omega)]^H \Sigma_{Sl}^{-1}[y_{K,l} - \mu_{K,l}(\Omega)]$$

where $\hat{\alpha}$ (K−1) is a previous estimate of a noise intensity, $\beta$ is a weighting factor, $y_{K,l}$ is sound data detected by the plurality of sensors at subband l, S is a number of the plurality of sensors, $\mu_{(K,l)}(\Omega)$ is predicted data based on a model of speech impinging on a spherical surface at subband l, and $$\Sigma_{Sl}^{-1}$$

is an unscaled covariance matrix.

10. The system of claim 5, wherein:

first noise covariance matrix is determined at a first time;

the audio signal is detected at a second time; and the second time is after the first time.

11. The system of claim 5, wherein the Kalman filter is an extended Kalman filter.

12. A computer-implemented method, comprising:
   determining an audio signal using a sensor array, the sensor array comprising a plurality of sensors to detect sound and the audio signal having a signal intensity and comprising a speech component and a noise component;
   estimating, based on the signal intensity, an estimated noise intensity of the noise component;
   determining a first noise covariance matrix comprising a plurality of first values, wherein each of the first values describes a covariance between a pair of sensors of the sensor array;
   multiplying the estimated noise intensity by the first noise covariance matrix to obtain a second noise covariance matrix; and
   estimating a direction of arrival of the speech component relative to the sensor array using a Kalman filter and the first noise covariance matrix and the second noise covariance matrix.

13. The computer-implemented method of claim 12, wherein the sensor array is generally spherical and the plurality of sensors are located proximate to a surface of the sensor array.

14. The computer-implemented method of claim 13 wherein determining the first noise covariance matrix comprises:
   determining an angular offset between a first position of a first sensor of the sensor array and a second position of a second sensor of the sensor array;
   determining a radius of the sensor array;
   determining a wave number of diffuse noise;
   calculating a first covariance value using the angular offset, the radius and the wave number; and
   including the first covariance value as one of the plurality of first values.

15. The computer-implemented method of claim 12, wherein estimating the estimated noise intensity comprises:
   determining a previous estimated noise intensity;
   adjusting the previous estimated noise intensity by a first weighting factor to determine a weighted previous estimated noise intensity;
   adjusting the signal intensity by a second weighting factor to determine a weighted signal intensity; and
   calculating the estimated noise intensity by adding the weighted previous estimated noise intensity to the weighted signal intensity.

16. The computer-implemented method of claim 12, wherein the estimated noise intensity $\hat{\alpha}$ at time K is given by the equation:

$$\hat{\alpha}(K) \triangleq \beta\hat{\alpha}(K-1) + \frac{1-\beta}{S}[y_{K,l} - \mu_{K,l}(\Omega)]^H \Sigma_{Sl}^{-1}[y_{K,l} - \mu_{K,l}(\Omega)]$$

where $\hat{\alpha}$ (K−1) is a previous estimate of a noise intensity, $\beta$ is a weighting factor, $y_{K,l}$ is sound data detected by the plurality of sensors at subband l, S is a number of the plurality of sensors, $\mu_{(K,l)}(\Omega)$ is predicted data based on a model of speech impinging on a spherical surface at subband l, and $$\Sigma_{Sl}^{-1}$$

is an unscaled covariance matrix.

17. The computer-implemented method of claim 12, wherein:
   first noise covariance matrix is determined at a first time;
   the audio signal is detected at a second time; and
   the second time is after the first time.

18. The computer-implemented method of claim 12, wherein the Kalman filter is an extended Kalman filter.

* * * * *